United States Patent [19]

Hirabayashi et al.

[11] Patent Number: 4,464,433
[45] Date of Patent: Aug. 7, 1984

[54] MAGNETIC RECORDING MEDIUM

[75] Inventors: Kenji Hirabayashi; Hitoshi Azegami, both of Tokyo, Japan

[73] Assignee: TDK Electronics Co., Ltd., Tokyo, Japan

[21] Appl. No.: 357,300

[22] Filed: Mar. 11, 1982

[30] Foreign Application Priority Data

Mar. 26, 1981 [JP] Japan .................. 56-44433

[51] Int. Cl.³ .................. B32B 15/00; B05D 5/12
[52] U.S. Cl. .................. 428/336; 428/694; 428/334; 427/132; 427/128
[58] Field of Search .............. 428/336, 694, 900, 334; 427/128–132; 252/62.54

[56] References Cited

U.S. PATENT DOCUMENTS 4,276,183 6/1981 Wilson .................. 428/480
4,347,291 8/1982 Tokuoka .................. 428/694

Primary Examiner—Michael R. Lusignan
Assistant Examiner—K. E. Jaconetty
Attorney, Agent, or Firm—Oblon, Fisher, Spivak, McClelland & Maier

[57] ABSTRACT

A magnetic recording medium which has dynamic range (I) of 70 dB or more and dynamic range (II) of 45 dB or more in control of a thickness of a magnetic layer and magnetic characteristics wherein said dynamic range (I) is given as a difference between an output at 3% input level of third harmonic wave output at a wavelength of 237.5 μm in the optimum bias recording by a head having a recorded width of 1 to 1.1 mm based on an output of the original signal and a reproduced output calibrated by auditory sense calibration at non-signal recording in the bias and said dynamic range (II) is given as a difference between a saturated output at a wavelength of 4.75 μm under the same condition and the reproduced output calibrated by the A-curve calibration at non-signal recording in the bias.

2 Claims, 4 Drawing Figures

MAGNETIC RECORDING MEDIUM

BACKGROUND OF THE INVENTION

1. Field of the Invention

The present invention relates to a magnetic recording medium having excellent balanced dynamic ranges in long wevelength and in short wavelength.

2. Description of the Prior Art

Recently, a magnetic recording medium has been remarkably developed. The practical developments for simplification in a compact cassette and a microcassette and high densityfication in a video tape are significant.

In view of recording having high fidelity in reproduction of the original signal, distortion of said developed products in a large input has not been satisfactory because of the consideration of simplification and miniaturization.

The inventors have been studied to improve quality of the magnetic recording and have succeeded in the present invention.

Referring to "Tape Recorder" published by Nippon Broadcast Publication Associate on Mar. 20, 1969 written by Miharu Abe, the magnetic recording problem will be illustrated.

In the normal magnetic recording, increase of an input level substantially corresponds to increase of an output. In a case of bias recording, a noise in reproduction at non-signal input (hereinafter referring to as bias noise) is depending upon a medium whereby a ratio of signal to noise (S/N ratio) seems to be increased. In low frequency, ghost signals having magnified frequencies (hereinafter referring to harmonic waves) are given beside the original signal input. The output of the harmonic waves also increase depending upon the increase of the input level at higher ratio whereby the waveform of the reproduced signal is distorted from sine wave. In quantitative measurement of distortion, it is usual to consider the third harmonic wave having triple frequency to the original signal among these harmonic waves and to consider as an allowable distortion, an input level of the output of third harmonic wave for 3% of the output of the original signal "input in 3% distortion".

In high frequency recording, the reproduced signal can not follow to the increase of the input level. Even though the input level increases the reproduction output is not further improved to be saturation as the phenomenon. The input level at the saturation is referred to as "saturated input level" and the output is referred to as "saturated output".

The magnetic recording medium has critical wavelength for recording depending upon the material thereof. In analogue recording, the critical wavelength is preferably short wavelength. That is, it is possible to record for high frequency region. In digital recording, it is preferable to have broad frequency region in view of discretional consideration for signal regions in the recording.

SUMMARY OF THE INVENTION

It is an object of the present invention to provide a magnetic recording medium having low distortion to a large input in broad frequency regions.

It is another object of the present invention to provide a magnetic recording medium having balanced dynamic range in long wavelength (I) and dynamic range in short wavelength (II) which are higher than those of the conventional magnetic recording medium.

The foregoing and other objects of the present invention have been attained by providing a magnetic recording medium having dynamic range (I) of 70 dB or more and dynamic range (II) of 45 dB or more in control of a thickness of a magnetic layer and magnetic characteristics wherein said dynamic range (I) is given as a difference between an output at 3% input level of third harmonic wave output at a wavelength of 237.5 μm in the optimum bias recording by a head having a recorded width of 1 to 1.1 mm based on an output of the original signal and a reproduced output calibrated by auditory sense A-curve calibration in JIS at non-signal recording in the bias and said dynamic range (II) is given as a difference between a saturated output at a wavelength of 4.75 μm under the same condition and the reproduced output calibrated by the A-curve calibration at non-signal recording in the bias.

DETAILED DESCRIPTION OF THE PREFERRED EMBODIMENTS

The present invention will be illustrated in detail by certain embodiments.

In the evaluation, an open reel type tape recording having 4 tracks having each ¼ inch width pursuant to Japanese Industrial Standard (hereinafter referring to as the ¼ inch open recorder) is used.

The magnetic recording medium of the present invention are also effectively used in the other systems.

The magnetic recording medium of the present invention can be used in broad ranges in any field requiring broad frequency regions and a large dynamic range in various manner and can be easily used in desired systems depending upon an improvement of an apparatus.

EXAMPLE A

| | |
|---|---|
| Iron base metallic magnetic powder (coercive force of 1100 Oe) | 100 wt. parts |
| Vinyl chloride-vinyl acetate copolymer | 20 wt. parts |
| Polyester resin | 13 wt. parts |
| Lubricant | 5 wt. parts |
| Methyl ethyl ketone | 100 wt. parts |
| Methyl isobutyl ketone | 100 wt. parts |
| Toluene | 100 wt. parts |

The components were thoroughly mixed and dispersed in a ball mill and 5 wt.parts of a isocyanate crosslinking agent were added with stirring. The mixture was coated on a polyethyleneterephthalate base film having a thickness of 22 μm and was dried, processed for a surface processing and cured by heating to prepare samples having a thickness of a magnetic layer of 3, 4, 6, 8 or 10 μm which are referred to as A-1, A-2, A-3, A-4 and A-5.

EXAMPLE B

In accordance with the process of Example A except using a Co-adsorbed type iron oxide magnetic powder having a coercive force of 560 Oe and controlling a thicknes of a magnetic layer to 4, 5, 7, 9, 11, 13 or 17 μm each magnetic recording tape was prepared. The samples are referred as B-1, B-2, B-3, B-4, B-5, B-6 and B-7.

REFERENCE C

In accordance with the process of Example A except using a γ-iron oxide having a coercive force of 370 Oe and controlling a thickness of a magnetic layer to 5 or 13 μm each magnetic recording tape was prepared. The samples are referred to as C-1 and C-2.

Figure 1:
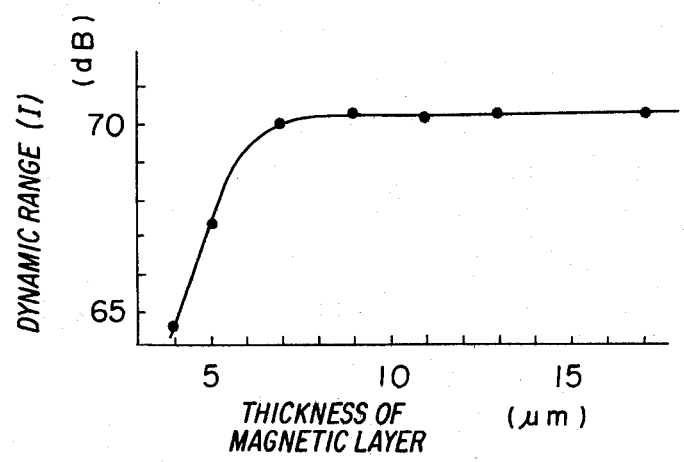
FIG. 1 is a graph showing the relation of a dynamic range (I) and a thickness of a magnetic layer.

FIG. 1 shows the dependency of the dynamic range (I) of the samples of Example B to the thickness of the magnetic layer. The dynamic range (I) remarkably increases depending upon the increase of the thickness of the magnetic layer to 5 μm and then is in flat and does not increase over the thickness of 10 μm or more.

Figure 2:
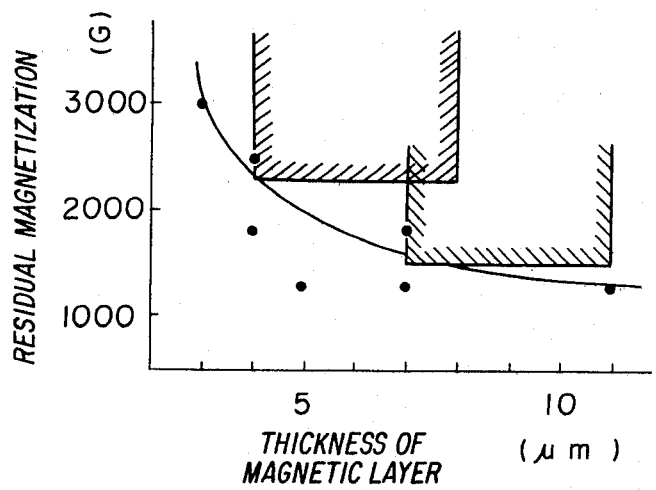
FIG. 2 is a graph showing the relation of a residual magnetization and a thickness of a dynamic range (I)

FIG. 2 shows the relations of the residual magnetization and the thickness of the magnetic layer to the dynamic range (I) of the samples obtained in Examples A and B and Reference C. In FIG. 2, the full line shows the relations of the residual magnetization and the thickness of the magnetic layer to give 70 dB of the dynamic range (I).

Figure 3:
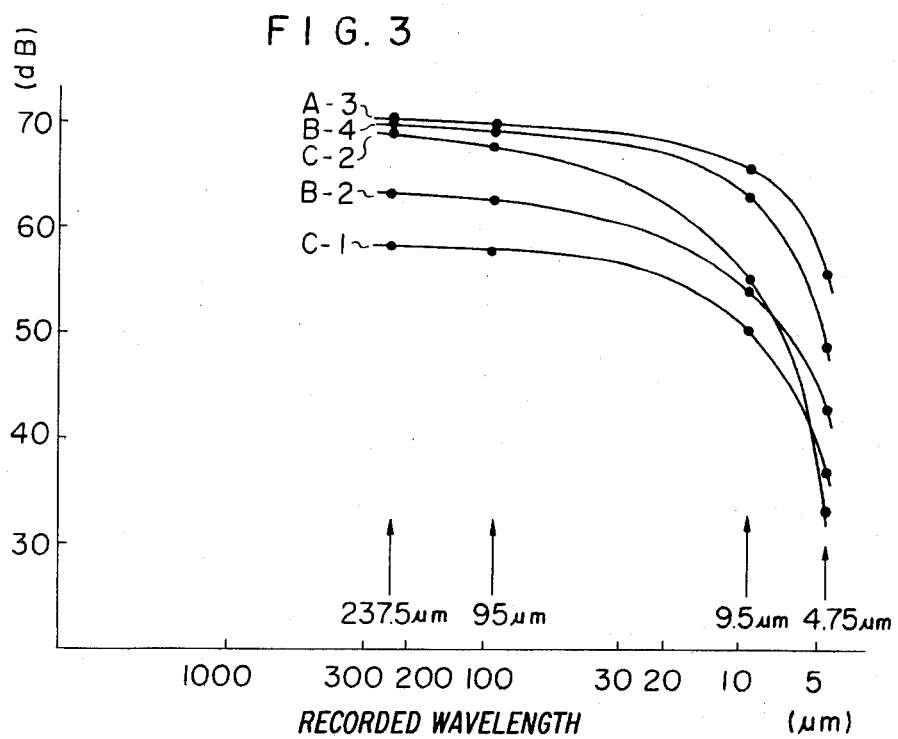
FIG. 3 is a graph showing dynamic ranges (I) and (II) in various wavelengths in parameters of a coercive force and a thickness.

FIG. 3 shows the relations of the recorded wavelength and the dynamic ranges of the samples for three kinds of the coercive force and three kinds of the thickness of the magnetic layer.

In the cases of the recorded wavelength of 237.5 μm, or 95 μm, values of the dynamic range (I) are shown and in the cases of the recorded wavelength of 9.5 μm and 4.75 μm, values of the dynamic range (II) are shown.

According to the results, the dynamic range (II) in the short wavelength region remarkably increases depending upon the increase of the coercive force.

In the ¼ inch open recorder used for the evaluation, it is necessary for the increase of the coercive force, to increase the bias current for the optimum bias and the erasing current during the erasing of the signal. Therefore, the ¼ inch open recorder is modified to give variable bias current and variable erasing current. It is understood that the coercive force is practically limited because of the recorder. In the ¼ inch open recorder, the practical dynamic range is limited by the modification of the recorder. When the recorder is remarkably modified, it may be possible to give the dynamic range (I) of 75 dB and the dynamic range (II) of 50 dB.

In the embodiment, the modification of the recorder is minimized and the dynamic ranges (I) and (II) are respectively set to 70 dB and 45 dB. The dynamic ranges can be further improved by improvement of the recorder.

In order to form the magnetic recording medium having the defined dynamic ranges (I) and (II) of the present invention, it is preferable to use the Co-adsorbed iron oxide having a coercive force of 450 Oe or more and a square ratio of 0.83 to 0.86 to give an orientation of 2.3 to 2.7 or the iron base metallic powder having a coercive force of 700 Oe or more and a square ratio of 0.80–0.84 to give an orientation of 2.0–2.3. The improvement is not limited to the open reel system.

The improved magnetic recording medium attains the advantages of higher dynamic ranges and longer recordable and reproducible time in the ¼ inch open recorder.

Figure 4:
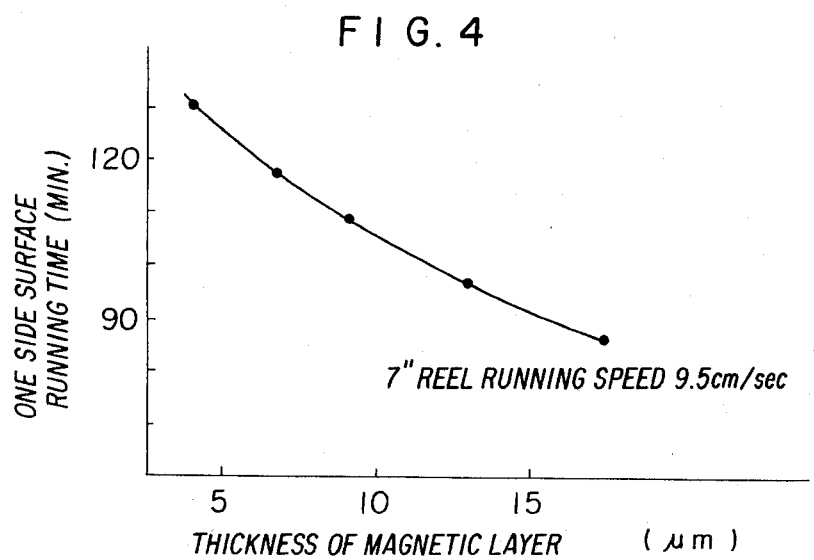
FIG. 4 is a graph showing the relation of a thickness of a magnetic layer and a running durable time in a case of running at a speed of 9.5 cm/sec., a magnetic tape of the present invention having a thickness of a non-magnetic substrate of 22 μm on a 7 inch reel in a ¼ inch open recorder.

FIG. 4 shows the relation of the thickness of the magnetic layer and the one side running durable time of the magnetic tape having a thickness of the non-magnetic substrate of 22 μm wound on a conventional 7 inch reel at a running speed of 9.5 cm/sec.

The conventional magnetic tape used in the ¼ inch open recorder has a thickness of the magnetic layer of 13 μm. Therefore, the running durable time of the samples of the present invention is longer by 1.1 to 1.4 times to that of the conventional magnetic tape. When a thickness of the substrate is thinner, the ratio of the running durability is higher.

We claim:

1. A magnetic recording medium which has a dynamic range (I) of 70 dB or more and dynamic range (II) of 45 dB or more wherein said dynamic range (I) is given as a difference between an output at 3% input level of third harmonic wave output at a wavelength of 237.5 μm in the optimum bias recording via head having a recorded width of 1 to 1.1 mm based on an output of the original signal and a reproduced output calibrated by auditory sense calibration at non-signal recording in the bias and said dynamic range (II) is given as a difference between a saturated output at a wavelength of 4.75 μm under the same condition and the reproduced output calibrated by the A-curve calibration at non-signal recording in the bias, wherein said recording medium is comprised of a substrate and a magnetic layer coated thereon, said magnetic layer being comprised of metallic iron powder having a coercive force of at least 700 Oe, a square ratio of 0.80–0.84 and an orientation of 2.0–2.3, said magnetic layer having a thickness greater than 5 μm.

2. The magnetic recording medium according to claim 1 which is formed by coating a magnetic layer containing a magnetic powder dispersed in a resin on a non-magnetic substrate wherein said magnetic layer has a thickness of 7 to 11 μm and a residual magnetization of 1500 gauss or more.

* * * * *